United States Patent
Sydorenko

[11] Patent Number: 6,091,773
[45] Date of Patent: Jul. 18, 2000

[54] DATA COMPRESSION METHOD AND APPARATUS

[76] Inventor: Mark R. Sydorenko, 136 Netherwood Ave., Plainfield, N.J. 07062

[21] Appl. No.: 08/968,644

[22] Filed: Nov. 12, 1997

Related U.S. Application Data

[60] Provisional application No. 60/030,806, Nov. 12, 1996.

[51] Int. Cl.[7] ................................... H04N 7/28
[52] U.S. Cl. .................. 375/240; 348/398; 348/405; 704/202; 704/222
[58] Field of Search .................. 348/398, 405; 375/240; 704/500, 202, 222; H04N 7/28

[56] References Cited

U.S. PATENT DOCUMENTS

| | | | |
|---|---|---|---|
| 3,624,302 | 11/1971 | Atal | 704/206 |
| 4,142,071 | 2/1979 | Croisier et al. | 704/229 |
| 4,803,727 | 2/1989 | Holt et al. | 381/1 |
| 5,040,217 | 8/1991 | Brandenburg et al. | 704/226 |
| 5,142,656 | 8/1992 | Fielder et al. | 704/229 |
| 5,199,078 | 3/1993 | Orglmeister | 704/230 |
| 5,214,741 | 5/1993 | Akamine et al. | 704/274 |
| 5,222,189 | 6/1993 | Fielder | 704/229 |
| 5,264,846 | 11/1993 | Oikawa | 341/76 |
| 5,285,498 | 2/1994 | Johnston | 381/2 |
| 5,301,205 | 4/1994 | Tsutsui et al. | 375/200 |
| 5,301,255 | 4/1994 | Nagai et al. | 704/230 |
| 5,341,457 | 8/1994 | Hall, II et al. | 704/226 |
| 5,475,789 | 12/1995 | Nishiguchi | 704/200 |
| 5,479,562 | 12/1995 | Fielder et al. | 704/200 |
| 5,481,614 | 1/1996 | Johnston | 381/2 |
| 5,488,665 | 1/1996 | Johnston et al. | 381/2 |
| 5,535,300 | 7/1996 | Hall, II et al. | 704/227 |
| 5,553,193 | 9/1996 | Akagiri | 704/229 |
| 5,581,653 | 12/1996 | Todd | 704/229 |
| 5,583,967 | 12/1996 | Akagiri | 704/229 |

(List continued on next page.)

OTHER PUBLICATIONS

Berlin, Charles—Editor (1984). *Hearing Science.* California, College–Hill Press.

Daugman, J.D. (1988). "Complete discrete 2–D Gabor transforms by neural networks for image analysis and compression". IEEE Trans.Acoustics., Speech, and Sig. Proc..36:1169–1179.

(List continued on next page.)

*Primary Examiner*—Howard Britton
*Attorney, Agent, or Firm*—Weingarten, Schurgin, Gagnebin & Hayes LLP

[57] ABSTRACT

A method and apparatus for measuring the "perceptual distance" between an approximate, reconstructed representation of a sensory signal (such as an audio or video signal) and the original sensory signal is provided. The perceptual distance in this context is a direct quantitative measure of the likelihood that a human observer can distinguish the original audio or video signal from the reconstructed approximation to the original audio or video signal. The method described herein applies to noisy compression techniques; the method provides the ability to predict the likelihood that the reconstructed noisy representation of the original signal will be distinguishable by a human observer from the original input representation. The method can be used to allocate bits in audio and video compression algorithms such that the signal reconstructed from compressed representation is perceptually similar to the original input signal when judged by a human observer. The method is based on a theory of the neurophysiological limitations of human sensory perception. Specifically, a "neural encoding model" (NEM) summarizes the manner in which sensory signals are represented in the human brain. The NEM is analyzed in the context of detection theory which provides a mathematical framework for statistically quantifying the detectability of differences in the neural representation arising from differences in sensory input. This NEM approach has been validated by demonstrating its ability to predict a variety of published psychoacoustic data, including masking and many other phenomenon.

91 Claims, 6 Drawing Sheets

U.S. PATENT DOCUMENTS

| | | | |
|---|---|---|---|
| 5,600,373 | 2/1997 | Chui | 348/398 |
| 5,625,743 | 4/1997 | Fiocca | 704/205 |
| 5,627,938 | 5/1997 | Johnston | 704/230 |
| 5,649,053 | 7/1997 | Kim | 704/229 |
| 5,651,093 | 7/1997 | Nishiguchi | 704/229 |
| 5,673,289 | 9/1997 | Kim et al. | 704/229 |
| 5,682,463 | 10/1997 | Allen et al. | 704/230 |
| 5,699,479 | 12/1997 | Allen et al. | 704/205 |
| 5,777,678 | 7/1998 | Ogata | 348/398 |
| 5,890,102 | 3/1999 | Kossentini | 348/398 |
| 5,926,791 | 7/1999 | Ogata | 704/500 |

OTHER PUBLICATIONS

Esteban and Gatand (1977). "Application of quadrature mirror filters to split band voice coding schemes". Proc. ICASSP.May:191–95.

Fletcher, Harvey (1995). *Speech and Hearing in Communication*. American Institute of Physics.

Green, David M. (1966). *Signal Detection Theory and Psychophysics*. New York, John Wiley & Sons.

Hamming (1989). *Digital Filters*. New Jersey, Prentice–Hall.

Irvine, D.R.F (1986). *Progress in Sensory Physiology 7: The Auditory Brainstem*. Germany, Springer Verlag.

Jayant, N., Johnston, J., and Safranek, R. (1993). "Signal compression based on models of human perception". Proc. IEEE. 81(10).

Jayantt,H.S, and Noll, P. (1984). *Digital Coding of Waveforms*. New Jersey, Prentice–Hall.

Jones, L.P..and Palmer, L.A. (1987). "An evaluation of the two–dimensional Gabor filter model of simple receptive fields in the cat striate cortex". J. Neurophysiol., 58(6):1233–1258.

Li,Jun. (1991). *Estimation of the Recovery of Discharge Probability in Cat Auditory Nerve Spike Trains and Computer Simulations*. Ph.D. Thesis. Johns Hopkins University.

Oppenheim, Alan V., and Schafer, Ronald W. (1975). *Digital Signal Processing*. New Jersy, Prentice–Hall.

Peterson, W.W., Birdsall, T. G., and Fox, W.C. (1954). "The Theory of Signal Detectability". Inst. Radio Engrs. Trans. Grp. Inf. Theory. 4:171–212.

Pickles, James O. (1982). *An Introduction to the Physiology of Hearing*. New York, Academic Press.

Princen, John, and Bradley, Allan B. (1986). "Analysis / synthesis filter bank design based on time domain aliasing cancellation". IEEE Trans. On Acoust.,Speech,Signal Proc.. ASSP–34(5) 1153–61.

Proakis, John G. (1989). *Digital Communications*, New York, McGraw–Hill.

Sydorenko, Mark R. (1992). *Functional Connectivity in the Cat Dorsal Cochlear Nucleus*. Ph.D. Thesis. Johns Hopkins University.

Veldhuis, Raymond N.J. (1992). "Bit rates in audio source coding". IEEE J. Select. Areas Commun.. 10(1):86–96.

Wang, Xiaoqin and Sachs, Murray B. (1994). "Neural encoding of single–formant stimuli in the cat II. Responses of anteroventral cochlear nucleus units". J. Neurophysiology. 71:59–78.

DATA COMPRESSION METHOD AND APPARATUS

CROSS REFERENCE TO RELATED APPLICATIONS

This application claims the benefit of U.S. Provisional Application Ser. No. 60/030,806, filed Nov. 12, 1996 (Attorney Docket No. SYD-001Xq800), incorporated herein by reference.

STATEMENT REGARDING FEDERALLY SPONSORED RESEARCH OR DEVELOPMENT

Not applicable.

FIELD OF THE INVENTION

The invention generally relates to audio and video coding (also referred to as compression) techniques, and specifically to determining whether an approximately reconstructed sensory signal (e.g. audio signal or video signal) is distinguishable from the original sensory signal by a human.

BACKGROUND OF THE INVENTION

The paramount objective of any audio or video coding technique is the ability to reconstruct the signal such that a human observer detects only minor differences, and preferably none, with respect to the original (non-coded) signal. For example, a good audio compression technique may take a high-quality representation of the audio signal (like a 44.1 kHz PCM representation found on commercial audio compact disks or CDs) and convert it to a more compact representation that requires fewer bits than the input representation. From this compact representation, one can reconstruct an approximation to the original high-quality representation. The process of compacting or compressing the audio signal can involve "lossless" (also referred to as "noiseless") techniques that preserve all the information in the input signal and/or "lossy" (also referred to as "noisy") compression techniques that discard information, particularly less important information, in the input signal.

Current lossy compression techniques are typically based on a model of the signal source or a model of the receiver (which is generally the human ear or eye) [Jayant, '93]. A vocoder, which uses a model of the vocal tract to compress speech signals, is an example of a source model-based compression technique. A perceptual coder, which uses models of human psychoacoustic thresholds (for example, masking thresholds), is an example of a receiver-based model.

The prior art, which incorporates methods related to "psychoperceptual audio coding," or simply "perceptual audio coding," techniques, exploits the auditory masking properties of the coded signal to at least partially mask or conceal the coding noise generated by the compression process. Such coders generally divide the frequency spectrum of the signal into psychoacoustic "critical bands", and compute a masking threshold, for each critical band, based on the properties of the signal in the current band as well as adjacent bands (termed "spread of masking"). Based on the computed masking thresholds, these perceptual audio coding methods perform compression by re-quantizing the signal such that the resulting coding noise, in each band, is close to or below the computed masking threshold. The presently disclosed method can be described as a perceptual approach to audio coding, however, the disclosed method does not make use of psychoacoustic critical band techniques or masking threshold computations. Rather, the presently disclosed method advantageously incorporates concepts related to neurophysiological information capacity and makes use of techniques that quantify the compressed signal fidelity necessary to reproduce a neural representation in the brain that is similar to that produced by the original signal.

SUMMARY OF THE INVENTION

The presently disclosed method and apparatus provides for measuring the "perceptual distance" between an approximate, reconstructed representation of a sensory signal (such as an audio or video signal) and the original sensory signal. The perceptual distance in this context is a direct quantitative measure of the likelihood that a human observer can distinguish the original audio or video signal from the reconstructed approximation to the original audio or video signal.

The disclosed method and apparatus have important applications in the fields of audio and video coding (also referred to as audio and video compression) techniques. The method described herein applies to noisy compression techniques; the method provides the ability to predict the likelihood that the reconstructed noisy representation of the original signal will be distinguishable by a human observer from the original input representation. Embodiments are presented that show how the described method can be used to allocate bits in audio and video compression algorithms such that the signal reconstructed from compressed representation is perceptually similar to the original input signal when judged by a human observer.

The described method stands in contrast to current approaches used in compressing audio and video signals. The described method is based on an unpublished theory of the neurophysiological limitations of human sensory perception. The centerpiece of this theory is a "neural encoding model" (NEM) which summarizes the manner in which sensory signals are represented in the human brain. The NEM is analyzed in the context of "detection theory," a field that grew out of research in radar target detection, and which provides a mathematical framework for statistically quantifying the detectability of differences in the neural representation arising from differences in sensory input. Thus the described method does not involve either source model techniques or receiver model techniques based upon psychoacoustic or "masking" phenomena. Rather, the described method and apparatus provide a neurophysiologically-based receiver model that includes uniquely derived extensions from detection theory to quantify the perceptibility of perturbations (noise) in the approximately reconstructed signal. This NEM approach has been validated by demonstrating its ability to predict a variety of published psychoacoustic data (including masking and many other phenomenon).

BRIEF DESCRIPTION OF THE DRAWINGS

The invention will be more fully understood by reference to the following description in conjunction with the accompanying drawings of which.

DETAILED DESCRIPTION

1. Overview

For clarity of explanation, an illustrative embodiment of the presently disclosed method and apparatus for measuring a perceptual distance between an approximate representation of an original signal and the original signal itself is presented as comprising individual functional blocks, including functional blocks referred to herein as "processors." The functions these blocks provide may be implemented through the use of either shared or dedicated hardware, including, but not limited to, hardware (e.g., state machines) capable of executing software. However, the use of the term "processor" should not be construed to refer exclusively to hardware capable of executing software. Illustrative embodiments comprise, singularly or in combination, digital signal processor (DSP) hardware, or personal computer (PC) hardware, and software performing the operations discussed below. Very large scale integration (VLSI) hardware embodiments of the present invention, as well as hybrid DSP/VLSI embodiments, may also be employed in realizing the presently disclosed system. These specific implementations are exemplary, and do not represent an exhaustive list of all suitable alternatives.

Encoder

Figure 1:
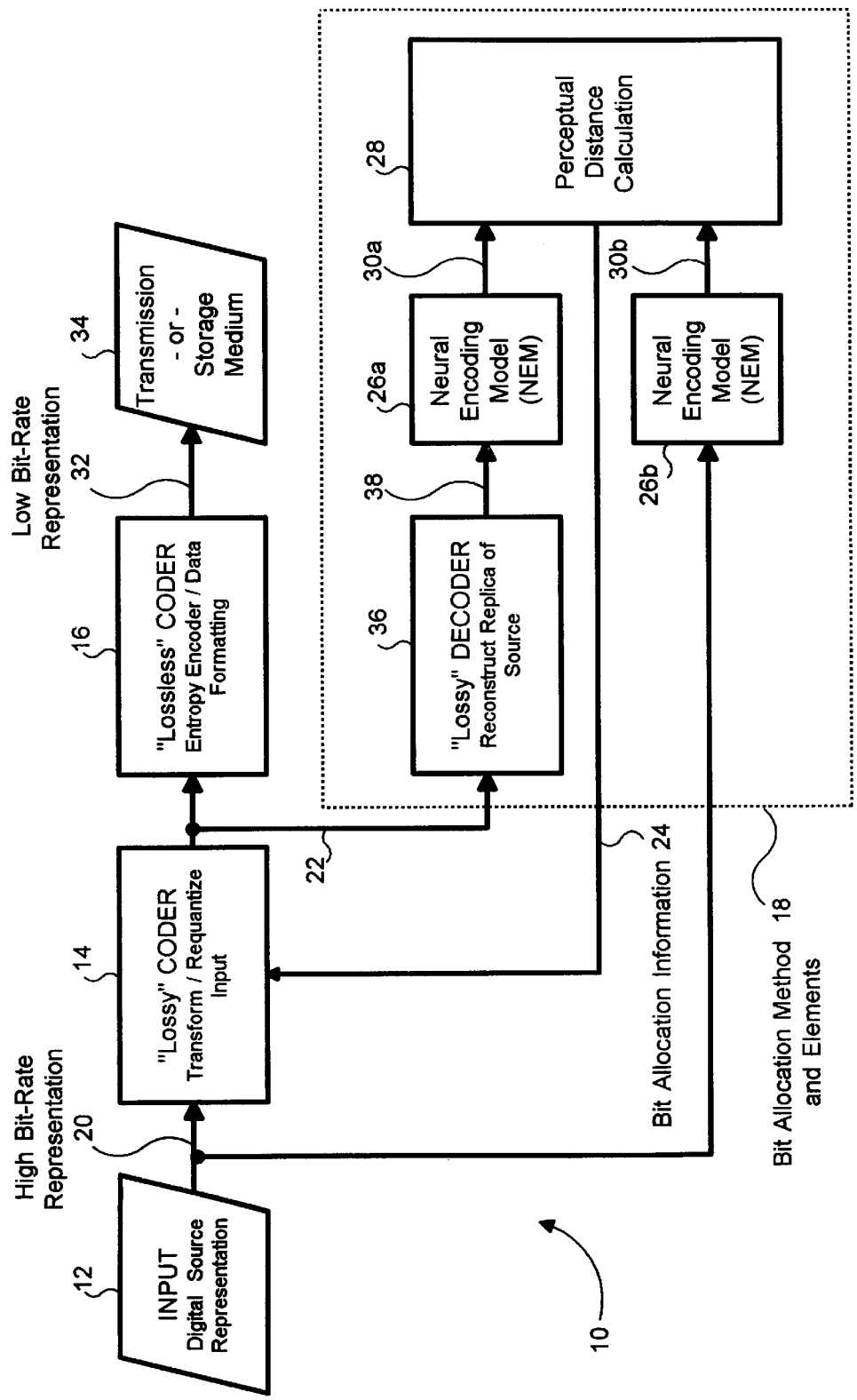
FIG. 1 is a block diagram of a neural encoding apparatus and method according to the presently disclosed invention for quantifying a perceptual distance between an original signal and an approximation thereof, and for effecting the generation of the approximation.

FIG. 1 is an illustrative embodiment of a system 10 according to the presently disclosed invention. This generalized block diagram illustrates an encoder, or "coder," as provided by the present invention, and represents an improvement over systems known in the prior art through the inclusion of specific contributions discussed herein. An encoder, together with the related decoder (jointly called a "codec"), perform the tasks of reducing the number of bits required to store and/or transmit digitally encoded data (compression) and reconstituting the data (decompression), respectively. The present invention applies to cases where the data is a digital source representation 12 of either audio or video sensory information. The illustrated encoder includes one or two stages of compression: (1) a "lossy" (or noisy) coder 14 which intelligently reduces the number of bits required to represent the input audio or video, thereby adding noise (distortion) to the representation; and, optionally, (2) a "lossless" (or noiseless) coder 16 which further reduces the number of bits and generates a low bit-rate representation 32 by removing embedded data redundancy while preserving all information content. Such lossless techniques are collectively referred to as entropy encoding by those skilled in the art.

The presently disclosed invention proposes, in part, an innovative advancement in and associated with the lossy coder 14. Specifically, it is desired to couple lossy encoding 14 with a bit allocation method and apparatus 18 which intelligently minimizes perceptible distortions in a reconstructed signal when compared to an original signal. One embodiment of the interaction of elements 18 enabling the bit allocation method with the lossy coder 14 is illustrated in FIG. 1. The elements 18 enabling the bit allocation method receive two inputs: (1) a high bit-rate source signal representation 20, which is also the input to the lossy coder 14; and (2) the transformed and/or requantized signal representation 22, which is the output from lossy coder 14. Based on an analysis of these two inputs 20, 22, the bit allocation method elements 18 output bit allocation instructions 24 to the lossy coder 14.

The present invention proposes a fundamentally new method and apparatus for determining optimal bit allocation at the lossy coder stage 14 based upon the bit allocation method and apparatus 18. The proposed method is advantageously based on recent advances in the understanding of neural-based sensory signal representation in the human brain. The present method incorporates computationally efficient summaries of the neurophysiologically-based transformations performed by the human brain on input sensory signals. These computational summaries, collectively referred to as a "neural encoding model" (NEM) 26a, 26b, are used to generate a neural-based representation of an input signal 20, 22. FIG. 1 collectively represents each of two computational neural representations as a single distinct processor labeled Neural Encoding Model (NEM) 26a, 26b. In FIG. 1, the NEM processors 26a, 26b are used to generate a neural representation of each of the following two signals: (1) the original high bit-rate source signal 20, and (2) a signal 38 reconstructed from the lossy coder output 22. The latter reconstructed signal 38 is provided by a lossy decoder 36 which essentially reconstructs an approximation of the high bit-rate representation 20 input to the lossy coder 14. This lossy decoder 36 is preferably the same lossy decoder to be employed in the decoder which is in communication with the transmission and/or storage medium 34. The two aforementioned NEM representations 30a, 30b serve as inputs to the next processing block, a "Perceptual Distance Calculation" 28.

The present method and apparatus additionally, and advantageously, draws on extensions from the field of detection theory, a mathematical/statistical framework originally developed to analyze radar target discrimination, to develop a method for computing the optimal allocation of bits in the compressed output 22 of the lossy coder 14. (Italicized words are herein used in accordance with their strict definitions and usages, as recognized by those skilled in the field of detection theory.) Optimal bit allocation, in the present method, is defined such that the perception of differences (e.g. distortions) between the original source 20 and lossy coded signals 22 are minimized or rendered imperceptible. To this end the presently disclosed method computes a "perceptual distance" metric which is directly related to the discriminability of the two NEM representations 30a, 30b. In other words, under the assumption that the two NEM outputs 30a, 30b (see FIG. 1) summarily reflect the neural representations evoked in the human brain, the "Perceptual Distance Calculation" processor 28 (see FIG. 1) computes the likelihood that a human could discriminate between the two representations 30a, 30b. The discriminability (perceptual distance) computation assumes that the human observer is an ideal receiver of the NEM representation 30a, 30b and, therefore, inherently assumes that the human is operating at maximum efficiency (e.g., colloquially known as "a golden ear" or "musically trained").

The Bit Allocation Method elements 18 and coder 14 form a computational loop (see FIG. 1) that converges to the optimal bit allocation in the lossy coded signal 22, and ultimately in the low bit-rate representation 32. Optimal bit allocation is achieved under either of two constraints: (1) computing an allocation that minimizes the number of bits while not exceeding a user-specified perceptual distance threshold; or (2) computing an allocation that minimizes the perceptual distance using a user-specified number of bits. Under constraint (1), the combination of Bit Allocation Method elements 18 and coder 14 yield a reduced bit-rate representation 22 such that the likelihood of a human discriminating a difference between the source signal 20 and the lossy coder output 22 never exceeds a given fixed threshold. Under constraint (2), the combination of bit allocation method elements 18 and coder 14 yields a fixed bit-rate representation 22 such that the likelihood of a human discriminating a difference is minimized.

Hence, the system outlined in FIG. 1 can operate in either of two modes: (1) variable bit-rate mode, or (2) constant bit-rate mode. Each of these modes has particular advantages depending on the application. In the variable bit-rate mode, the system 10 allocates the fewest number of bits necessary to represent the coded signal 22 without exceeding a given constant perceptual distance threshold; the variable bit-rate mode is suitable for applications where reproduction quality is particularly important, and a variable bit rate is tolerable. For the constant bit-rate mode, the system 10 minimizes the perceptual distance while allocating a fixed number of bits to the coded representation 22. The constant bit-rate mode is suitable for applications that expect a constant data rate (e.g. communications systems) and that can tolerate variable reproduction quality.

The output of the lossy coder 14, the low bit-rate representation 22, is provided in one embodiment directly to a transmission and/or storage medium 34. In an alternative embodiment, the output of the lossy coder 14, the low bit-rate representation 22, is directed through a lossless coder 16, such as that known in the art, prior to being made available at the transmission and/or storage medium 34.

Further embodiments of the presently disclosed method and apparatus include multi-channel adaptations of the generalized single-channel embodiments illustrated and discussed in the disclosure. The single-channel embodiments extend to include multi-channel applications such as stereoscopic and color (e.g. RGB channels) video, and stereophonic and "surround" (e.g. three or more channels) audio. Multi-channel variations include replicating the single-channel embodiment of the presently disclosed invention for each channel, and combination with multi-channel techniques known to those skilled in the art (for example, coding mutual channel information as in stereophonic L+R, L−R representations, as well as the use of spectral filtering techniques to reduce sub-channel bandwidth).

Decoder

According to the presently disclosed invention, one embodiment of a decoder is interfaced to the low bit-rate representation 32 of the original source signal 20 via the transmission and/or storage medium 34 to reconstruct a replica of the original source signal 20 by performing the encoder operations in reverse order. Thus, a decoder interfaced to the encoder 10 of FIG. 1 includes a lossless decoder (substantially the inverse to the lossless coder 16), followed by the functional equivalent to the lossy decoder 36 utilized in the Bit Allocation Method functional block 18. The output of the encoder 10 embodied in FIG. 1 includes data formatting information necessary for unpacking the entropy-coded signal 32, as well as bit allocation information necessary for transforming and/or re-quantizing the lossy coded signal 22 to yield a reconstruction of the original source signal 20. The decoder executes the processes of the system embodied in FIG. 1, with the exception of the bit allocation method 18, in reverse order to reconstruct the signal 20.

A decoder interfaced to an embodiment of the encoder 10 that does not utilize a lossless coder 16 function likewise omits a complementary lossless decoder prior to the complementary lossy decoder.

2. Illustrative Embodiment—Audio Coding

Illustrative embodiments describing best mode implementations of the present invention are presented separately for audio signal coding and video signal coding. Audio and video implementations differ principally only in the Neural Encoding Model 26a, 26b details associated with the Bit Allocation Method elements 18 (refer to FIG. 1). Otherwise, both audio and video implementations share essentially the same methodology summarized in the Overview section, including the same approach to perceptual distance calculation 28 (FIG. 1), bit allocation strategy 18, and the two major modes of operation (variable and constant bit-rate). The description of the audio coding implementation also serves to illustrate one variation of the generalized embodiment of FIG. 1, applicable to both audio and video coding, which reduces computational redundancy.

Audio Coding Overview

Figure 2:
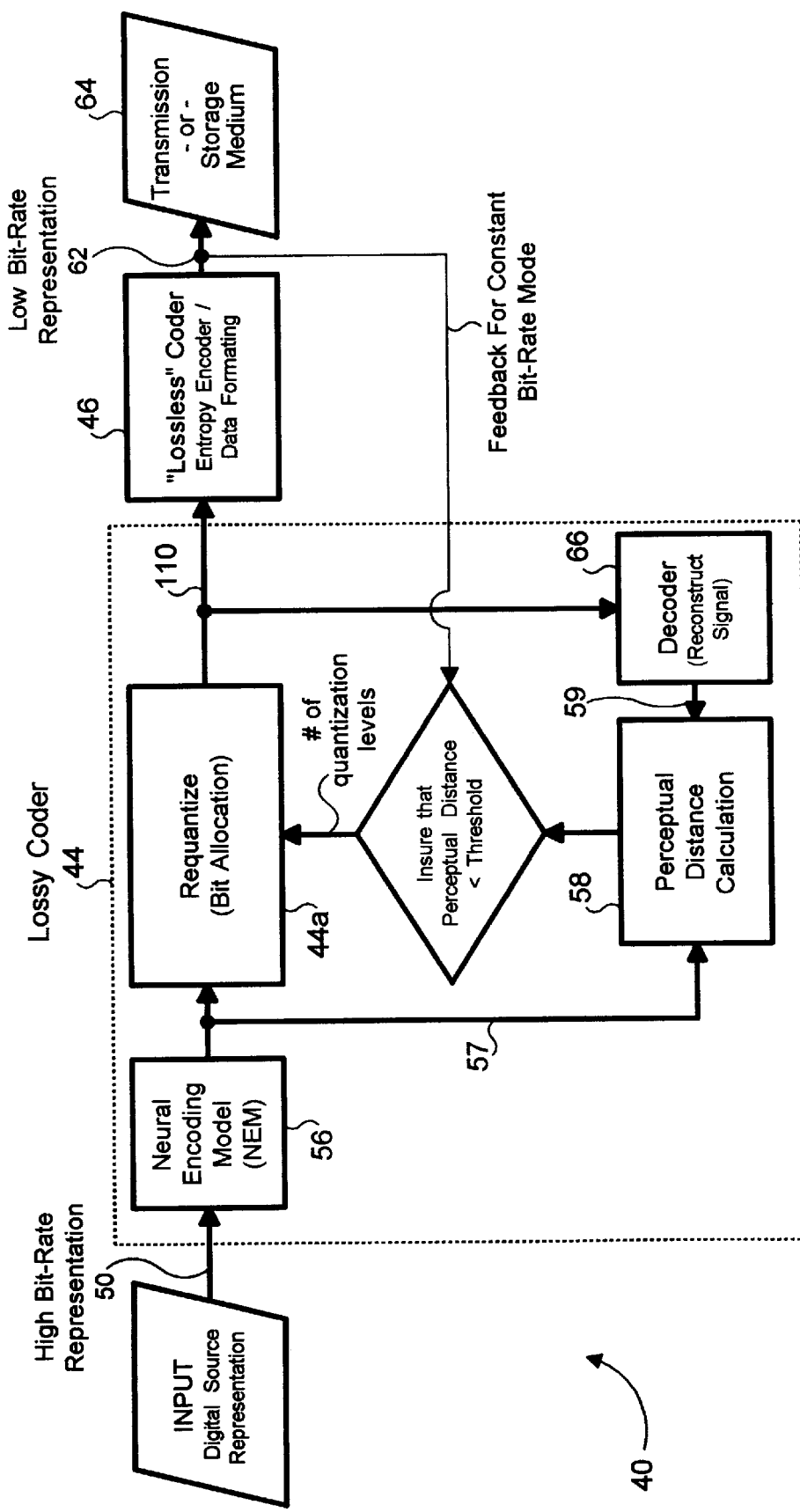
FIG. 2 is a block diagram of the apparatus and method of FIG. 1 configured as a first embodiment of an audio signal encoder.

FIG. 2 illustrates an embodiment of the present invention configured as an audio signal encoder 40. The objective of the system is to provide a low distortion, low bit-rate representation 62 of the high bit-rate source audio 50. In this embodiment, the corresponding NEM 56 (discussed below, in FIGS. 3 and 4) performs a perfect-reconstruction transformation of the input signal 50 ("perfect-reconstruction" in the sense that the input signal 50 can be reconstructed exactly from the output signal 57 of the NEM 56). A perfect reconstruction NEM transformation is used advantageously to reduce computational overhead by incorporating the NEM 56 into the lossy coder 44; a comparison of FIG. 2 with FIG. 1 reveals the elimination of one NEM processor 26a, 26b in this desirable configuration.

Figure 3:
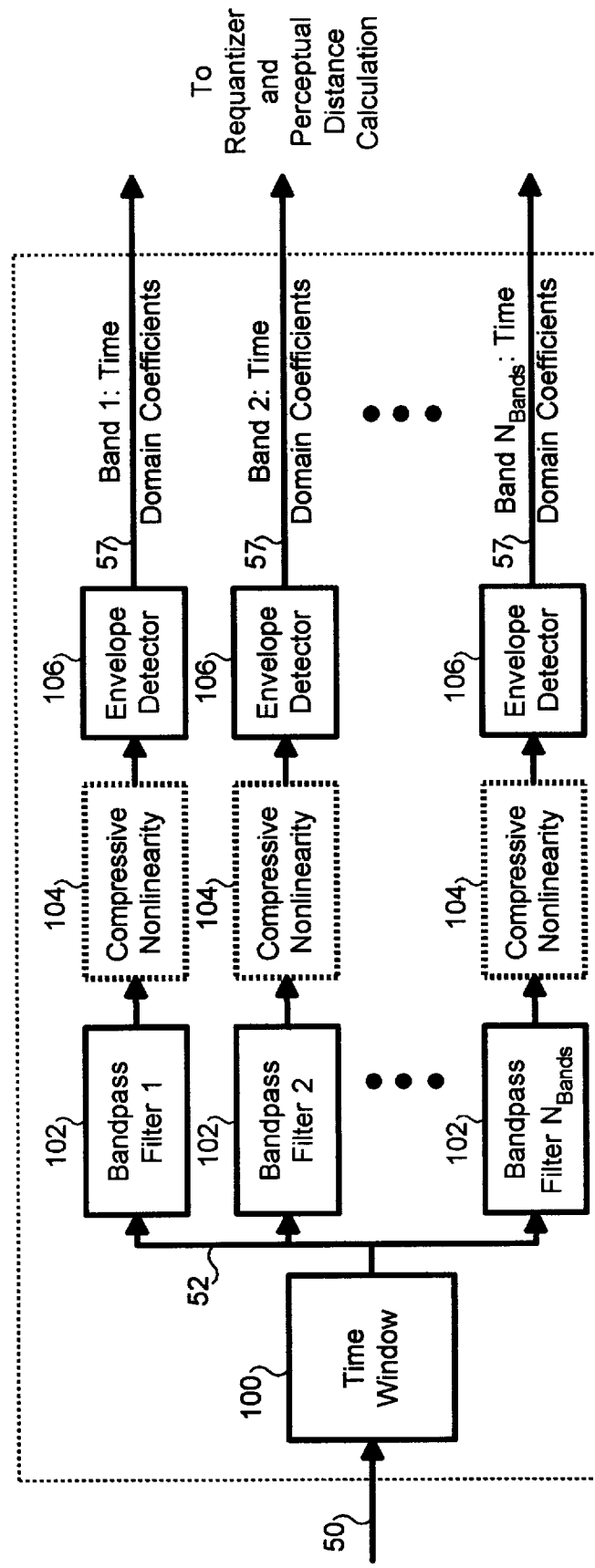
FIG. 3 is a block diagram of a first time-domain embodiment of the neural encoding model of FIGS. 1 and 2 for use in an audio codec.

FIG. 3 presents a first embodiment of the Neural Encoding Model (NEM) 56. This embodiment also serves to illustrate the best mode parameters for an audio codec. The NEM 56, in this example, consists of a data windowing function 100, followed by a bank of bandpass filters 102, an optional compressive non-linearity 104, and an envelope detector 106. At this level, the system 56 embodied in FIG. 3 represents a gross summary of the key physiological elements known to be involved in processing auditory information in humans [Pickles, '82; Berlin '84; Irvine, '86; Sydorenko, '92; Wang, '94]. However, it will become apparent to those skilled in the field of auditory physiology and audio coding, that the specific best mode modifications (discussed below) to this basic structure are not consistent with published literature in the field of auditory physiology nor with the prior art in the fields of audio signal processing.

The data windowing processor, labeled Time Window 100 in FIG. 3, performs the operation of windowing successive blocks of the input data stream 50. The successive blocks of data may overlap in time, and the data blocks optionally may be re-sampled, in conjunction with the following Bandpass Filter processor 102, according to recently published critical sampling techniques that advantageously remove data redundancy while ensuring perfect-reconstruction (discussed below).

In a first embodiment of the presently disclosed invention, the data window duration is in the range of 100 to 400 milliseconds. This choice of window duration is directly related to the Perceptual Distance Calculation 58, which in turn is directly based on a "neurophysiological buffer length." The neurophysiological buffer length associated with the Perceptual Distance Calculation describes the maximum duration of a sensory signal that the brain can analyze at one time. Those skilled in the field of detection theory will recognize that the choice of window (neurophysiological buffer) length has a critical bearing on the predictive accuracy of the Perceptual Distance Calculation 58 [Peterson, '54; Proakis, '89]. Those skilled in the field of psychoacoustics will recognize that the neurophysiological buffer length, as it relates to human amplitude modulation detection thresholds [Fletcher, '95], is approximately 300 milliseconds. Those skilled in the field of audio coding will recognize that a 100 to 400 millisecond window length is substantially longer than current practice [Veldhuis, '92; Jayant, '93], and substantially greater than that found in the prior art.

In one variation of the embodiment illustrated in FIG. 3 and alluded to previously, the data windowing function 100 can advantageously divide the window into two or more sub-windows of equal, shorter duration. Those skilled in the field of audio coding will recognize that shorter windows possess advantageous properties with respect to pre-echo control and I/O delay (for real-time applications). The shorter duration sub-windows permit the system to benefit from the properties of short windows while retaining the desirable best mode window duration for the Perceptual Distance Calculation processor 58. For example, the windowing processor 100 may window successive (overlapping) 50 millisecond windows and pass them to the following Bandpass Filter processor 102. The Envelope Detector processor 106 may maintain a 200 millisecond FIFO buffer. As successive 50 millisecond data sub-windows replace the oldest 50 millisecond data sub-window in the 200 millisecond buffer, the lossy coder 44—bit allocation method loop processes the most current 50 millisecond sub-window in the context of all the data in the 200 millisecond buffer window. The former illustration is a specific example of plural embodiments that encompass any combination of window and sub-window duration provided the Perceptual Distance Calculation 58 window is approximately 100 to 400 milliseconds in duration.

The Bandpass Filter bank 102 in FIG. 3 decomposes the windowed signal 52 into multiple channels, each channel output being a time-domain representation of the windowed data in consecutive frequency bands, such that the sum over all channels perfectly reconstructs the input data 52. Various techniques may be used to implement the filter bank 102; no particular technique is critical to the practice of the present invention. Examples of possible filtering techniques include so-called Finite Impulse Response (FIR) filters and Infinite Impulse Response (IIR) filters [Oppenheim, '75; Hamming, '89], and implementations using techniques such as polynomial filters, or transforms such as the Discrete or Fast Fourier Transform (DFT or FFT), the Discrete Cosine Transform (DCT), the Quadrature Mirror Filter (QMF), and the Time Domain Alias Cancellation (TDAC) [Esteban, '77; Princen, '86]. This list is merely exemplary of suitable techniques and is not intended to be exhaustive.

Best mode dictates that the Bandpass Filters 102 all have bandwidths in the approximate range of 100 to 400 Hertz. As with the Time Window 100 duration, the choice of filter width is directly related to the Perceptual Distance Calculation 58, which in turn is directly related to the "neurophysiological channel bandwidth capacity." The neurophysiological channel bandwidth capacity describes the maximum amplitude modulation bandwidth encodable by a single neurophysiological channel. The Perceptual Distance Calculation 58 computes the perceptual distance (discriminability) for each channel independently (discussed below). Hence, those skilled in the field of detection theory will recognize that the choice of filter bandwidth has a critical bearing on the predictive accuracy of the Perceptual Distance Calculation [Peterson, '54; Proakis, '89]. Those skilled in the field of psychoacoustics and auditory neurophysiology will recognize that these filter widths are substantially narrower and do not vary with center frequency as reported for auditory channels (known as "critical bands") [Pickles, '82; Fletcher '95]. Those skilled in the field of audio coding will also recognize that 100 to 400 Hertz sub-band widths are substantially narrower than current practice [Veldhuis, '92; Jayant, '93], and substantially narrower than that found in the prior art.

The final two sub-processors in the NEM 56 embodiment of FIG. 3, the Compressive Non-linearity 104 and the Envelope Detector 106, are conditionally optional. Conceptually, the Envelope Detector is critical to the implementation of the present invention. However, as it will become clear in the following discussion, variations of the illustrated general embodiment preserve the functional significance of the Envelope Detector 106 without explicitly including such sub-processors in the NEM processor module 56.

The exact form of the Compressive Non-linearity 104 has a minor bearing on the performance of the system 40 in practice. Therefore, the Compressive Non-linearity 104 may be eliminated in variations of the illustrated embodiment for efficiency. A preferred embodiment requires the non-linearity to take the form of a mildly compressive instantaneous non-linearity. Good candidates resemble a logarithmic function or an exponential (in analogy with mu-law compression) of the form $$output = |input|^\alpha \times \text{sign}(input),$$

$$\text{where } \frac{1}{3} \leq \alpha \leq 1, |x| = \text{absolute value of } x,$$

$$\text{and sign}(x) = \begin{cases} 1 \text{ if } x > 0 \\ 0 \text{ if } x = 0 \\ -1 \text{ if } x < 0 \end{cases}.$$

Physiologically, the Compressive Non-linearity 104 represents the sum of the compressive contributions of the human cochlea and neurophysiological processing [Pickles, '82; Wang, '94].

The Envelope Detector 106 (or demodulator) processor removes the carrier signal from the input and passes the modulator signal (the Hilbert envelope) as its output 57. In the frequency domain, this is equivalent to shifting all frequency components in the passband toward zero by an amount equal to the lowest frequency in the passband. The output of the Envelope Detector 106 is a critically sampled representation of the Hilbert envelope derived from the input to the Envelope Detector. Critical re-sampling of the Detector 106 output signal 57 reduces the overall sample rate (summed across all bands) down to the level of the input source sample rate. Various fundamental techniques well known to those skilled in the field of digital signal processing may be used to implement the Envelope Detector processor 106; the choice of technique is not critical to the practice of the present invention.

In a variation of the embodiment illustrated in FIG. 3, the Compressive Non-linearity processor 104 is placed after (rather than before) the Envelope Detector processor 106. This configuration has advantages, depending on the specific implementation of the present invention, such as lowering the computational load to the Non-linearity processor 104 due to the reduction of bit rate after the Envelope Detector 106, and offering computational efficiencies in specific frequency domain implementations of the NEM processor 56 (an example is discussed below).

The output 57 of the NEM 56 in FIG. 3, when incorporated into the codec system embodiment of FIG. 2, serves as the input into (1) the lossy Re-quantizer processor 44a, as well as (2) the Perceptual Distance Calculation processor 58. The output 57 of the NEM processor 56 of FIG. 3 contains a perfect-reconstruction representation of the windowed input source signal 52. This NEM representation 57 is re-quantized, under the control of the Perceptual Distance Calculation 58, to become the output 110 of the Lossy Coder 44.

The Re-quantizer module 44a uses a reduced number of bits to represent an approximation to the input 57. A variety of vector quantization techniques can be used to implement the re-quantization [Jayant, '76]. One straight-forward approach includes, for each channel or groups of channels, computing a group scale factor (otherwise referred to as step size) and choosing a reduced number of quantization levels to approximate each NEM coefficient 57. The output 110 of the Re-quantizer 44a represents the output of the Lossy Coder 44 to the Lossless Coder 46 (the same as or substantially similar to the Lossless Coder 16 of FIG. 1), and is also passed to the Perceptual Distance Calculation 58 as part of the lossy coder—bit allocation method loop described in conjunction with FIG. 1. As illustrated in FIG. 1, the lossy coder—bit allocation method loop in FIG. 2 includes a decoder 66 to generate a signal 59, which is a lossy reconstruction of the input 57 to the Re-quantizer 44a. Ideally, this decoder 66 is identical, or at least substantially similar to that employed in a counterpart decoder in communication with the transmission and/or storage medium 64.

Figure 4:
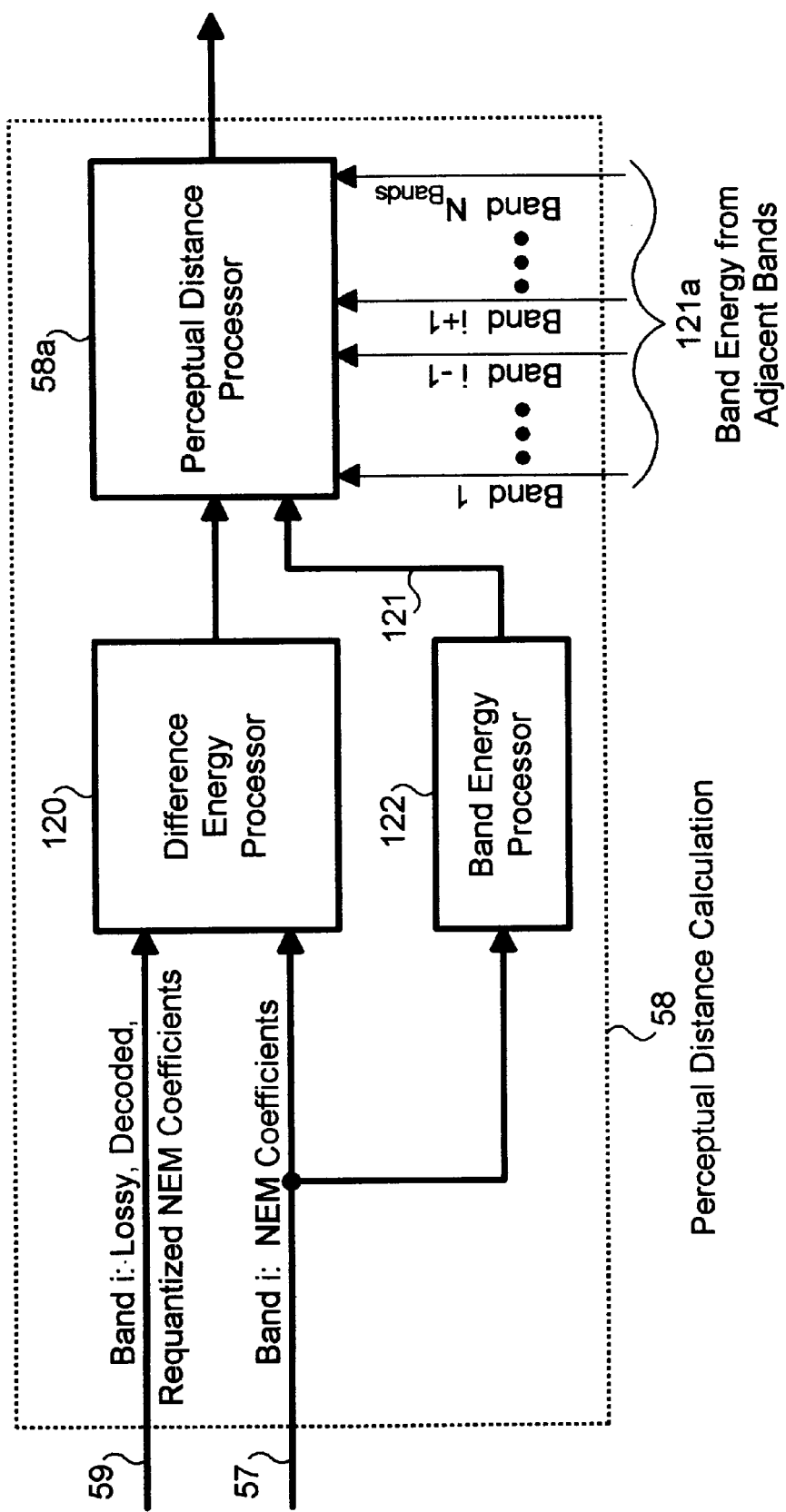
FIG. 4 is a block diagram of a module performing the perceptual distance calculation of FIGS. 1 and 2.

FIG. 4 illustrates an embodiment of the Perceptual Distance Calculation. The Perceptual Distance Calculation is based on the following equations:

$$\text{Perceptual Distance (Band \#}i) = \frac{\text{Difference Energy }(i)}{\text{Noise Energy }(i)},$$

where $$\text{Difference Energy }(i) = \sum_{j=1}^{\#\text{ coef in band }i} (x_j^i - y_j^i)^2,$$

Noise Energy $(i) = f(\text{Band Energy }(i) + \text{Adjacent Band Energy }(i))$ (see text), $$\text{Band Energy }(i) = \sum_{j=1}^{\#\text{ coef in band }i} x_j^{i\,2},$$

$$\text{Adjacent Band Energy }(i) = \sum_{k \neq i}^{\text{all bands}} \beta k - i \sum_{j=1}^{\#\text{ coef in band }k} x_j^{k\,2},$$

$x_j^i = j^{th}$ envelope coefficient of the $i^{th}$ NEM band (output of NEM), $y_j^i = j^{th}$ envelope coeffiecient of the $i^{th}$ Re-quantizer band (output of Re-quantizer), and $0 \le \beta_i \le 1$ (see text).

For any given band, the Perceptual Distance, when properly scaled, is a measure of the likelihood (probability ratio) that a human will be able to distinguish between the original source signal and the decoded, re-quantized, lossy signal in a standard psychoacoustic discrimination paradigm (e.g. a two-interval forced choice, 2IFC, task) [see Green, '66; Peterson, '54]. As it relates to the presently disclosed invention, the Perceptual Distance represents a metric whose value increases as the perceptibility of the difference between the source and lossy coded signal increases. The general idea is to keep the Perceptual Distance small, thereby lowering the probability that distortions due to lossy coding are detectable by a human observer.

The denominator of the Perceptual Distance equation, the Noise Energy (see equations above), represents a level of neural representational variability, or variance. In general, neural variance increases semi-proportionately with increasing signal level—semi-proportionately because the neural variance increases at a slightly lower rate than the signal level [see, Li, '91]. The latter phenomenon is incorporated into the Perceptual Distance Processor 58a by applying a mildly compressive function, f(x), in the Noise Energy equation (see above). This compressive function, f(x) in the Noise Energy equation shown above, can take a variety of forms depending upon the embodiment, including:

$$f(x) = x\left(1 - \frac{x}{\alpha}\right),$$

where $\alpha > 2*$(maximum absolute value of x), or $f(x)=x^\alpha$, where $0.7 \le \alpha \le 1$.

Any compressive function with behavior similar to the functions above can be used to implement the present invention. In one embodiment of the presently disclosed invention, the choice of function f(x) includes letting f(x)=x, the omission of the compressive function altogether.

The Adjacent Band Energy equation, which is incorporated in the Perceptual Distance Processor 58a, represents noise (variance) contributed by neighboring bands via physiological mechanisms such as the spread of energy (excitation) within the cochlea, and convergent neural processing [Pickles, '82; Sydorenko, '92]. Relative to the Band Energy 121, the Adjacent Band Energy 121a contributes a fractional amount to the total in the Noise Energy equation (see above). Energy contributed by adjacent bands decreases with increasing distance from the center band in a manner consistent with psychoacoustic measurements of the spread of masking in humans. Therefore, the values of the weighting factors, β, in the Adjacent Band Energy equation shown above can be obtained directly from a variety of published measurements quantifying the spread of masking in humans.

Taken as a whole, the system described above and illustrated in FIGS. 2, 3 and 4 performs the task of compressing digital audio information. The number of bits required to represent the source audio is reduced after the Lossy Coder 44, and further reduced after the Lossless Coder 46. At the Lossy Coder 44, the representation of the audio is converted to a NEM representation 57. The NEM representation is re-quantized 44a, with bit allocation controlled by the Perceptual Distance Calculation 58, such that the Perceptual Distance, in each band, is held below a specified perceptual distance threshold. The Re-quantizer 44a and Perceptual Distance Calculation 58 form a computational loop that searches for the optimal bit allocation, that is, allocates the fewest number of bits necessary to represent the signal without exceeding the specified perceptual distance threshold in any band. When operating in the variable bit rate mode, the system operates with a constant user-specified perceptual threshold(s). When operating in the constant bit-rate mode, the computational loop additionally monitors the bit-rate at the output of the system (after the Lossless Coder/data formatter). To achieve a constant bit-rate at the output, independent of the nature of the source audio, the computational loop jointly varies (scales) the perceptual distance threshold(s) up or down to achieve a constant user-specified output data rate while not exceeding the re-scaled perceptual threshold in any band.

Frequency-domain Methods

A computationally efficient variation on the embodiment described above and illustrated in FIGS. 2, 3 and 4 can be achieved by implementing the NEM of FIG. 3 in the frequency-domain. The previous discussion emphasized the use of time-domain representations and techniques to illustrate the system 40. Although the previously described embodiments underscored that plural specific techniques can be utilized to implement the presently disclosed system, certain techniques may offer particular computational efficiencies (i.e. reductions in the number of operations required to execute the process). The further embodiment presented below is set in the context of the systems embodied in FIGS. 1, 2 and 4 and the foregoing descriptions thereof, and thus incorporates all of the previous discussion by reference, except where noted.

Figure 5:
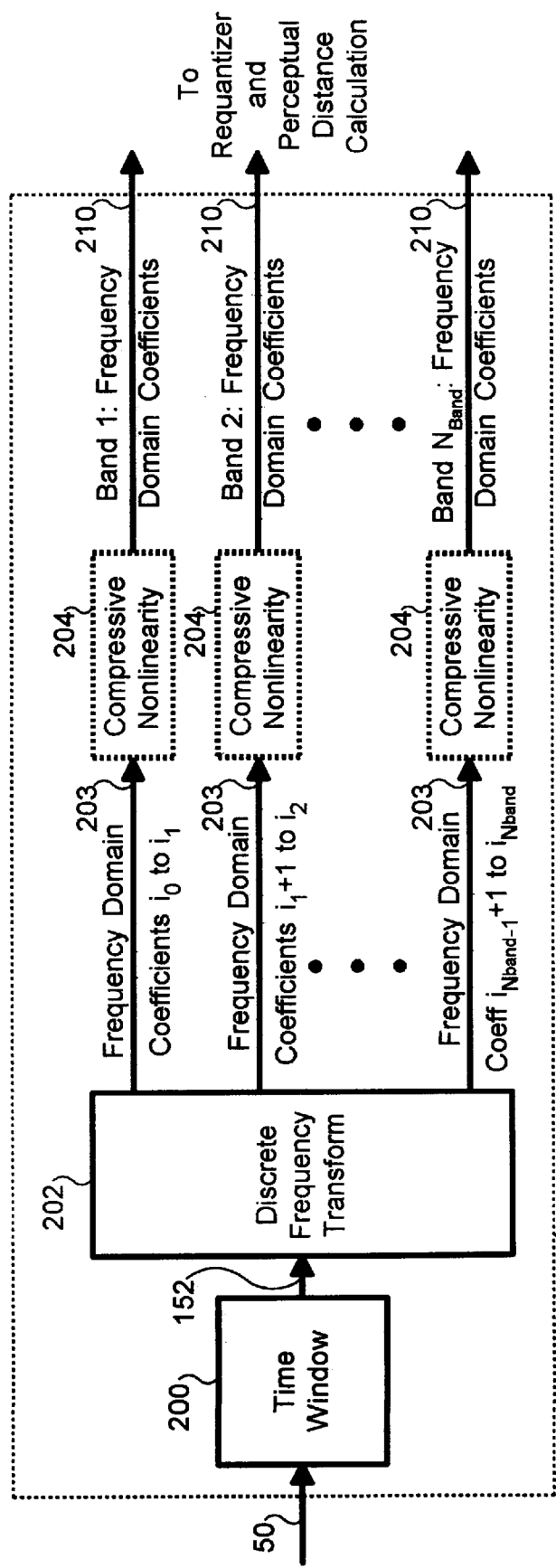
FIG. 5 is a block diagram of a second frequency-domain embodiment of the neural encoding model of FIGS. 1 and 2 for use in an audio codec.

FIG. 5 emphasizes a frequency-domain NEM implementation 256 of the embodiment illustrated in FIG. 3. The elements presented in FIGS. 3 and 5 are substantially similar, such that the output 210 of FIG. 5 is a perfect-reconstruction representation of the input 152, except that the output representation 210 in FIG. 5 consists of frequency-domain coefficients rather than time domain coefficients as in FIG. 3. The output 152 of the Time Window 200 is transformed to the spectral domain (the Time Window 200 and its output 152 in the embodiment of FIG. 5 is the same as or substantially similar to the Time Window 100 and output 52 of FIG. 3). Those skilled in the art of coding recognize that a variety of techniques can be used to perform the transformation, such as those cited in the previous discussion. However, techniques such as the Time Domain Alias Cancellation (TDAC) offer additional advantages with respect to other techniques [Princen, '86].

The output of the Discrete Frequency Transform 202 in FIG. 5 is a vector of coefficients 203 representing the amplitudes of uniformly distributed frequency components. The frequency components are grouped into consecutive, non-overlapping bands. As noted previously, each band encompasses a 100 to 400 Hz range of frequency components.

The frequency coefficients are optionally processed by the Compressive Non-linearity 204, as discussed above. The form of the Compressive Non-linearity equation is substantially similar to that described previously.

The remaining processing is substantially similar to that described earlier and illustrated in FIGS. 1, 2, and 4. The NEM 256 coefficients 210 comprising the output of the embodiment in FIG. 5 are passed to both the Requantizer 44a as well as the Perceptual Distance Calculation processor 58, just as the output 57 of the NEM 56 in the embodiment of FIG. 2. The Perceptual Distance Calculation 58 and bit allocation loop are functionally identical to that described earlier.

3. Illustrative Embodiment—Video Coding

For brevity and efficiency, the discussion under the heading "Illustrative Embodiment—Audio Coding" above is relevant also to the present description of Video Coding except where noted in the discussion below.

Figure 6:
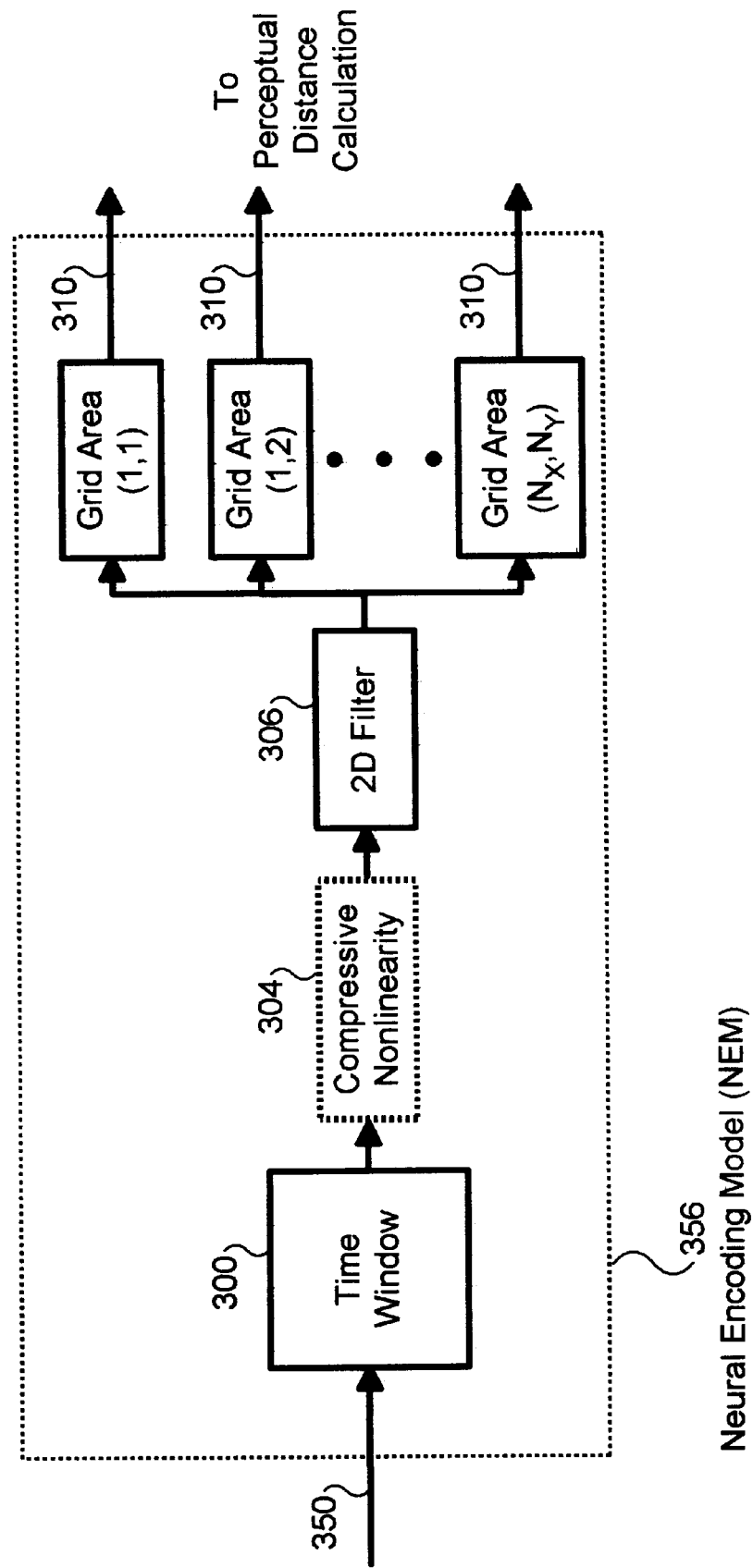
FIG. 6 is a block diagram of a first time-domain embodiment of the neural encoding model of FIG. 1 for use in a video codec.

FIG. 6 is one illustrative embodiment of a video Neural Encoding Model (NEM) 356. The Time Window processor 300 performs the operation of windowing successive blocks of the input data stream 350 as previously described. In contrast to the audio NEM 56, 256, no restrictions are placed on the specific duration of the time window in the video NEM 356. The luminance values of the video representation are optionally processed by a Compressive Non-linearity 304 according to functions detailed previously.

The 2-D Filter 306 in FIG. 6 represents aspects of the monoscopic neural processing of the two dimensional image raster. In one embodiment of the 2-D Filter 306, discrete time representations of the two dimensional image luminance raster are processed by a Gabor filter [Paugman, '88]. Those skilled in the field of visual neurophysiology recognize that Gabor filters approximate many aspects of the neurophysiological representation of visual images [Jones, '87]. Those skilled in the field of video coding also recognize inherent advantages of representing video data using Gabor-type expansions [Daugman, '88]. Generally, any two-dimensional filter with spatial filtering properties resembling the Gabor filter (i.e. two-dimensional, symmetric, damped harmonic function) provide adequate representation for the practice of the invention. The optimal Gabor filter parameters can be obtained from published measurements of visual neural receptive field maps [for example, Daugman, '88].

Finally, the output of the two-dimensional filter 306 is segregated into square areas 310 that together form a spatial grid representation of the windowed image sequence. No restrictions are placed on the dimensional parameters of the spatial grid.

The video NEM 356, in one embodiment, is implemented in the context of the embodiments illustrated in FIGS. 1 or 2. The use of Gabor filters in the NEM 356 is consistent with the implementation outline in FIG. 2. The importance of perfect-reconstruction representations is diminished in the video codec implementation (as compared to the audio codec implementation). Other video coding techniques offer additional coding efficiencies—many of these techniques are consistent with the system architecture of FIG. 1. In either case, the system operates in substantially the same manner as that described for the audio codec embodiment. That is, the Bit Allocation Method, which incorporates a video NEM 356, controls the allocation of bits in the lossy video representation by minimizing the perceptual distance between the source and lossy coded image.

A reference to FIG. 4 is also useful in describing an embodiment of the video Perceptual Distance Calculation. The only modification in the computation of the video perceptual distance is the addition of an extra spatial dimension. The one-dimensional frequency bands of the audio case are analogous to the two-dimensional grid areas in the present video case. The luminescence coefficients are summed over the two-dimensional spatial area—the previous perceptual distance calculations are modified by introducing an additional summation dimension in all energy calculations.

A further video coding embodiment is based upon the frequency domain NEM 256 of FIG. 5 in conjunction with the video NEM 356 of FIG. 6. Additionally, the presently disclosed invention further contemplates various combinations of the realizations disclosed above, including a multi-channel video codec employing a frequency domain NEM 256.

These and other examples of the invention illustrated above are intended by way of example and the actual scope of the invention is to be limited solely by the scope and spirit of the following claims.

References

Berlin, Charles—Editor (1984). *Hearing Science.* California, College-Hill Press.

Daugman, J. D. (1988). "Complete discrete 2-D Gabor transforms by neural networks for image analysis and compression". IEEE Trans. Acoustics., Speech, and Sig. Proc., 36:1169–1179.

Esteban and Gatand (1977). "Application of quadrature mirror filters to split band voice coding schemes". Proc. ICASSP. May:191–95.

Fletcher, Harvey (1995). *Speech and Hearing in Communication.* American Institute of Physics.

Green, David M. (1966). *Signal Detection Theory and Psuchophysics.* New York, John Wiley & Sons.

Hamming (1989). *Digital Filters.* New Jersey, Prentice-Hall.

Irvine, D. R. F (1986). *Progress in Sensory Physiology 7: The Auditory Brainstem.* Germany, Springer-Verlag.

Jayant, N., Johnston, J., and Safranek, R. (1993). "Signal compression based on models of human perception". Proc. IEEE. 81(10).

Jayant, H. S, and Noll, P. (1984). *Disital Coding of Waveforms.* New Jersey, Prentice-Hall.

Jones, L. P. and Palmer, L. A. (1987). "An evaluation of the two-dimensional Gabor filter model of simple receptive fields in the cat striate cortex". J. Neuroplisiol., 58(6): 1233–1258.

Li, June (1991). *Computer Simulations.* Ph.D. Thesis. Johns Hopkins University.

Oppenheim, Alan V., and Schafer, Ronald W. (1975). *Digtal Signal Processing.* New Jersey, Prentice-Hall.

Peterson, W. W., Birdsall, T. G., and Fox, W. C. (1954). "The Theory of Signal Detectability". Inst. Radio Engrs. Trans. Grp. Inf. Theory. 4:171–212.

Pickles, James O. (1982). *An Introduction to the Physiology of Hearing.* New York, Academic Press.

Princen, John, and Bradley, Allan B. (1986). "Analysis/synthesis filter bank design based on time domain aliasing cancellation". IEEE Trans. On Acoust., Speech, Signal Proc. ASSP-34(5):1153–61.

Proakis, John G. (1989). *Digital Communications.* New York, McGraw-Hill.

Sydorenko, Mark R. (1992). *Functional Connectivity in the Cat Dorsal Cochlear Nucleus.* Ph.D. Thesis. Johns Hopkins University.

Veldhuis, Raymond N. J. (1992). "Bit rates in audio source coding". IEEE J. Select. Areas Commun. 10(1):86–96.

Wang, Xiaoqin and Sachs, Murray B. (1994). "Neural encoding of single-formant stimuli in the cat II. Responses of anteroventral cochlear nucleus units". J. Neurophysiology. 71:59–78.

What is claimed is:

1. A method for calculating a perceptual distance between a data signal and a first representation of said data signal, comprising the steps of:

partitioning a time ordered representation of said data signal using a windowing processor; decomposing said partitioned data into multiple channels using a filter bank, each channel representing partitioned data components of respective frequency bands;

quantizing said decomposed data in a quantization engine;

reconstructing said decomposed data from said quantized data using a decoder;

determining an energy difference between said quantized data and said reconstructed data in a difference energy processor; and adjusting said quantization engine based upon a comparison between a predetermined threshold and said energy difference.

2. The method of claim 1 wherein said data signal is chosen from the group consisting of audio and video data signals.

3. A method for calculating a perceptual distance between a data signal and a first representation of said data signal, comprising the steps of:

partitioning a time ordered representation of said data signal using a windowing processor;

decomposing said partitioned data into vector coefficients of uniformly distributed frequency components using a discrete frequency transform;

quantizing said decomposed data in a quantization engine;

reconstructing said decomposed data from said quantized data using a decoder;

determining an energy difference between said quantized data and said reconstructed data in a difference energy processor; and adjusting said quantization engine based upon a comparison between a predetermined threshold and said energy difference.

4. The method of claim 3 wherein said data signal is chosen from the group consisting of audio and video data signals.

5. A compression system providing an intermediate, compressed representation of an original signal from which a final reconstruction of said original signal is to be generated, comprising:

a lossy coder for receiving said original signal and for generating said compressed representation based upon perceptual distance data calculated between a neural encoding model representation of an intermediate reconstruction of said original signal and a neural encoding model representation of said original signal.

6. The compression system of claim 5, further comprising a complimentary lossy decoder for receiving said compressed representation and for generating said final reconstruction therefrom.

7. The compression system of claim 6, further comprising a signal medium intermediate said lossy coder and said complimentary lossy decoder.

8. The compression system of claim 7, wherein said signal medium is selected from the group consisting of a transmission medium and a storage medium.

9. The compression system of claim 7, further comprising:

a lossless coder in communication with said lossy coder for receiving said compressed representation from said lossy coder, and for generating an entropy-encoded, compressed representation in response thereto; and a lossless decoder in communication with said complimentary lossy decoder for receiving said entropy-encoded, compressed representation, and for recovering said intermediate, compressed representation.

10. The compression system of claim 5, wherein said coder is implemented in elements selected from the group consisting of a digital signal processor, a programmable computer, and VLSI circuitry.

11. The compression system of claim 5, wherein said original signal is selected from the group consisting of an audio signal and a video signal.

12. The compression system of claim 5, wherein said original signal is one of plural signal channels collectively comprising a multi-channel original signal, and wherein said lossy coder is replicated for each channel of said multi-channel original signal.

13. The compression system of claim 5, wherein said lossy coder further comprises a representational transformer and requantizer for allocating a reduced number of bits required to represent said original signal according to said perceptual distance data.

14. The compression system of claim 13, further comprising a lossless coder in communication with said lossy coder for receiving said compressed representation from said lossy coder, and for generating an entropy-encoded, compressed representation in response thereto comprised of said reduced number of bits.

15. The compression system of claim 14, wherein said allocation minimizes the number of bits required to represent said original signal while not allowing said perceptual distance to exceed a pre-determined perceptual distance threshold.

16. The compression system of claim 14, wherein said allocation minimizes said perceptual distance using a pre-determined number of bits to represent said original signal.

17. The compression system of claim 13, wherein said lossy coder further comprises a reconstruction element in communication with said representational transformer and requantizer for substantially reversing said representational transformation and selective reduction in the number of bits required to represent said original signal, introduced by said representation transformer and requantizer, and for generating said intermediate reconstruction of said original signal.

18. The compression system of claim 17, wherein said lossy coder further comprises a first neural encoding modeler in communication with said reconstruction element for generating said neural encoding model representation of said intermediate reconstruction.

19. The compression system of claim 18, wherein said lossy coder further comprises a second neural encoding modeler for receiving said original signal and for generating said neural encoding model representation of said original signal.

20. The compression system of claim 19, wherein said lossy coder further comprises a perceptual distance calculation unit in communication with said first and second neural encoding modelers for receiving said neural encoding model representation of said intermediate reconstruction and said neural encoding model representation of said original signal, for generating said perceptual distance data, and for providing said perceptual distance data to said representational transformer and requantizer for use by said representational transformer and requantizer in said selective reduction in the number of bits required to represent said original signal.

21. The compression system of claim 5, wherein said lossy coder comprises a neural encoder for generating a neural encoding model representation of said original signal.

22. The compression system of claim 21, wherein said lossy coder further comprises a requantizer for selectively reducing a number of bits required to represent said neural encoding model representation of said original signal according to said perceptual distance data.

23. The compression system of claim 22, further comprising a lossless coder in communication with said requantizer for receiving said compressed representation from said requantizer, and for generating an entropy-encoded, compressed representation in response thereto comprised of said reduced number of bits.

24. The compression system of claim 23, wherein said requantization minimizes the number of bits required to represent said original signal while not allowing said perceptual distance to exceed a pre-determined perceptual distance threshold.

25. The compression system of claim 23, wherein said requantization minimizes said perceptual distance using a pre-determined number of bits to represent said original signal.

26. The compression system of claim 22, wherein said lossy coder further comprises a reconstruction element in communication with said requantizer for substantially reversing said selective reduction in the number of bits required to represent said neural encoding model representation of said original signal, introduced by said requantizer, and for generating a neural encoding model representation of said intermediate reconstruction of said original signal.

27. The compression system of claim 26, wherein said lossy coder further comprises a perceptual distance calculation unit in communication with said neural encoder and said reconstruction element for receiving said neural encoding model representation of said original signal and said neural encoding model representation of said intermediate reconstruction, for generating said perceptual distance data, and for providing said perceptual distance data to said requantizer for use by said requantizer in said selective reduction in the number of bits required to represent said original signal.

28. The compression system of claim 5, wherein said lossy coder further comprises a data windowing element for temporally windowing successive blocks of data from said original signal.

29. The compression system of claim 28, wherein said windowed successive blocks overlap in time.

30. The compression system of claim 28, wherein each of said windowed successive blocks has a duration substantially in the range of 100 to 400 milliseconds.

31. The compression system of claim 28, wherein said data windowing element is further for subdividing said windowed successive blocks into temporally overlapping subwindows each of duration less than each of said windowed successive blocks.

32. The compression system of claim 28, wherein said lossy coder further comprises a bandpass filter bank in communication with said data windowing element for decomposing said windowed successive blocks into multiple, consecutive frequency band channels.

33. The compression system of claim 32, wherein said filter bank comprises an element selected from the group consisting of a finite impulse response filter, an infinite impulse response filter, a polynomial filter, a discrete fourier transform element, a fast fourier transform element, a discrete cosine transform element, a quadrature mirror filter, and a discrete sine transform element.

34. The compression system of claim 32, wherein said filter bank comprises a sub-critical sampling element in conjunction with a frequency domain alias cancelling element.

35. The compression system of claim 32, wherein the bandwidth of each filter in said bandpass filter bank is substantially in the range of 100 to 400 Hertz.

36. The compression system of claim 32, wherein said lossy coder further comprises compressive nonlinearity processors in communication with said bandpass filter bank for introducing a compressive instantaneous non-linearity into the output of said consecutive frequency band channels.

37. The compression system of claim 32, wherein said lossy coder further comprises an envelope detector processor in communication with said bandpass filter bank for generating the envelope representations for the outputs of said consecutive frequency band channels, and for critically re-sampling said envelope representations to reduce the sample rate.

38. The compression system of claim 37, wherein said lossy coder further comprises compressive nonlinearity processors in communication with said envelope detector for introducing a compressive instantaneous non-linearity into the output of said envelope detector processor.

39. The compression system of claim 32, wherein said requantizer receives said consecutive frequency band channels and computes, for groups of one or more of said channels, a group scale factor or quantization level for each group required to approximately represent said consecutive frequency band channels.

40. The compression system of claim 27, wherein said perceptual distance calculation unit further comprises a difference energy processor for determining a value representative of the energy difference per frequency band between said neural encoding model representation of said original signal and said neural encoding model of said intermediate reconstruction as a measure of said perceptual distance data.

41. The compression system of claim 40, wherein said lossy coder further comprises a perceptual threshold comparator in communication with said perceptual distance calculation unit and said requantizer for comparing said perceptual distance data against a perceptual distance threshold for each frequency band.

42. The compression system of claim 40, wherein said perceptual distance calculation unit further comprises a band energy processor for determining the total energy per frequency band from said neural encoding model of said original signal.

43. The compression system of claim 42, wherein said perceptual distance calculation unit further comprises a perceptual distance processor for calculating a perceptual distance metric based upon said energy difference value per frequency band and said total energy per frequency band.

44. The compression system of claim 43, wherein said perceptual distance processor is further for determining an adjacent band noise energy contribution to said total energy per band in calculating said perceptual distance metric.

45. The compression system of claim 28, wherein said lossy coder further comprises a transform element for transforming said windowed successive blocks into plural bands of frequency domain coefficients.

46. The compression system of claim 45, wherein said transform element further comprises an element selected from the group consisting of a discrete frequency transform element, a fast fourier transform element, a discrete cosine transform element, and a discrete sine transform element.

47. The compression system of claim 45, wherein said transform element further comprises a sub-critical sampling element in conjunction with a time domain alias cancellation processor for performing said transformation.

48. The compression system of claim 45, wherein each of said plural bands of frequency domain coefficients encompasses substantially a 100 to 400 Hertz range.

49. The compression system of claim 45, wherein said lossy coder further comprises compressive nonlinearity processors in communication with said discrete frequency transform element for introducing a compressive instantaneous non-linearity into said plural bands of frequency domain coefficients.

50. The compression system of claim 45, wherein said requantizer receives said plural bands of frequency domain coefficients and computes, for groups of one or more of said bands, a group scale factor or quantization level for each group required to approximately represent said consecutive frequency bands.

51. The compression system of claim 28, wherein said lossy coder further comprises a two-dimensional filter for processing said windowed successive blocks as discrete time representations of a two-dimensional image raster.

52. The compression system of claim 51, wherein said two-dimensional filter is a Gabor filter.

53. The compression system of claim 51, wherein said lossy coder further comprises a compressive non-linearity processor for introducing a compressive instantaneous non-linearity into said windowed successive blocks prior to processing by said two-dimensional filter.

54. The compression system of claim 51, wherein said lossy coder further comprises a grid array filter for segregating said filtered two-dimensional image raster into plural tiles, collectively defining said filtered, two-dimensional image raster.

55. A data compression method for providing an intermediate, compressed representation of an original signal from which a final reconstruction of said original signal is to be generated, comprising:

receiving said original signal by a lossy coder;

generating a neural encoding model representation of an intermediate reconstruction of said original signal by said lossy coder;

generating a neural encoding model representation of said original signal by said lossy coder;

calculating, by said lossy coder, a perceptual distance between said neural encoding model representation of an intermediate reconstruction of said original signal and said neural encoding model representation of said original signal; and requantizing, by said lossy coder, said original signal to form said intermediate, compressed representation of said original signal, based upon said perceptual distance.

56. The compression method of claim 55, further comprising:

substantially reversing said requantization of said original signal by a complimentary lossy decoder to generate said final reconstruction therefrom.

57. The compression method of claim 56, further comprising:

transmission of said intermediate, compressed representation, by said lossy coder, to a signal medium intermediate said lossy coder and said complimentary lossy decoder.

58. The compression method of claim 56, further comprising:

receiving, by a lossless coder, said intermediate, compressed representation from said lossy coder;

generating, by said lossless coder, an entropy-encoded, compressed representation of said intermediate, compressed representation;

receiving said entropy-encoded, compressed representation by a lossless decoder; and recovering, by said lossless decoder, said intermediate, compressed representation.

59. The compression method of claim 55, further comprising:

representationally transforming and requantizing said original signal, by said lossy coder, to allocate a reduced number of bits required to represent said original signal according to said perceptual distance data.

60. The compression method of claim 59, further comprising generating, by a lossless coder, an entropy-encoded, compressed representation of said intermediate, compressed representation of said reduced number of bits.

61. The compression method of claim 60 wherein said requantizing minimizes the number of bits required to represent said original signal while not allowing said perceptual distance to exceed a pre-determined perceptual distance threshold.

62. The compression method of claim 60, wherein said requantizing minimizes said perceptual distance using a pre-determined number of bits to represent said original signal.

63. The compression method of claim 59, further comprising:
substantially reversing said representational transformation and selective reduction in the number of bits required to represent said original signal, by said lossy coder, for generating said intermediate reconstruction of said original signal.

64. The compression method of claim 55, further comprising:
requantizing said original signal, by said lossy coder, to selectively reduce a number of bits required to represent said neural encoding model representation of said original signal according to said perceptual distance data.

65. The compression method of claim 64, further comprising generating, by a lossless coder, an entropy-encoded, compressed representation of said intermediate, compressed representation of said reduced number of bits.

66. The compression method of claim 65, wherein said requantizing minimizes the number of bits required to represent said original signal while not allowing said perceptual distance to exceed a pre-determined perceptual distance threshold.

67. The compression method of claim 65, wherein said requantizing minimizes said perceptual distance using a pre-determined number of bits to represent said original signal.

68. The compression method of claim 64, further comprising:
substantially reversing said selective reduction in the number of bits required to represent said neural encoding model representation of said original signal, introduced by said requantizing, in generating said neural encoding model representation of said intermediate reconstruction of said original signal.

69. The compression method of claim 55, wherein said generating a neural encoding model representation of said original signal further comprises:
temporally windowing successive blocks of data from said original signal.

70. The compression method of claim 69, wherein said temporally windowing windows successive blocks that overlap in time.

71. The compression method of claim 69, wherein said temporally windowing windows successive blocks of a duration substantially in the range of 100 to 400 milliseconds.

72. The compression method of claim 69, wherein said generating a neural encoding model representation of said original signal further comprises:
decomposing said windowed successive blocks into multiple, consecutive frequency band channels using a bandpass filter bank.

73. The compression method of claim 72, wherein said each filter in said bandpass filter bank used in said decomposing has a bandwidth substantially in the range of 100 to 400 Hertz.

74. The compression method of claim 72, wherein said generating a neural encoding model representation of said original signal further comprises:
introducing a compressive instantaneous non-linearity into the output of said consecutive frequency band channels.

75. The compression method of claim 72, wherein said generating a neural encoding model representation of said original signal further comprises:
envelope detecting the outputs of said consecutive frequency band channels for generating envelope representations, and for critically re-sampling said envelope representations to reduce the sample rate.

76. The compression method of claim 75, wherein said generating a neural encoding model representation of said original signal further comprises:
introducing a compressive instantaneous non-linearity into the output of said envelope detector processor.

77. The compression method of claim 72, wherein said requantizing said original signal further comprises:
receiving said consecutive frequency band channels; and
computing, for groups of one or more of said channels, a group scale factor or quantization level for each group required to approximately represent said consecutive frequency band channels.

78. The compression method of claim 55, wherein said calculating a perceptual distance further comprises:
determining a value representative of the energy difference per frequency band between said neural encoding model representation of said original signal and said neural encoding model of said intermediate reconstruction as a measure of said perceptual distance data.

79. The compression method of claim 78, wherein said calculating a perceptual distance further comprises:
comparing said perceptual distance data against a perceptual distance threshold for each frequency band.

80. The compression method of claim 78, wherein said calculating a perceptual distance further comprises:
determining the total energy per frequency band from said neural encoding model of said original signal.

81. The compression method of claim 80, wherein said calculating a perceptual distance further comprises:
calculating a perceptual distance metric based upon said energy difference value per frequency band and said total energy per frequency band.

82. The compression system of claim 81, wherein said calculating a perceptual distance further comprises:
determining an adjacent band noise energy contribution to said total energy per band in calculating said perceptual distance metric.

83. The compression method of claim 55, wherein said generating a neural encoding model further comprises:
transforming said windowed successive blocks into plural bands of frequency domain coefficients.

84. The compression method of claim 83, wherein said transforming comprises:
time domain alias cancelling said windowed successive blocks into plural bands of frequency domain coefficients.

85. The compression method of claim 83, wherein said transforming further comprises:
transforming said windowed successive blocks into said plural bands of frequency domain coefficients, each encompassing substantially a 100 to 400 Hertz range.

86. The compression method of claim 83, wherein said generating a neural encoding model representation of said original signal further comprises:

for introducing a compressive instantaneous non-linearity into said plural bands of frequency domain coefficients.

87. The compression method of claim 83, wherein said requantizing said original signal further comprises:

receiving said plural bands of frequency domain coefficients; and computing, for groups of one or more of said bands, a group scale factor or quantization level for each group required to approximately represent said consecutive frequency bands.

88. The compression method of claim 55, wherein said generating a neural encoding model further comprises:

processing said windowed successive blocks as discrete time representations of a two-dimensional image raster using a two-dimensional filter.

89. The compression method of claim 88, wherein said processing further comprises using a Gabor filter as said two-dimensional filter.

90. The compression system of claim 88, wherein said generating neural encoding model further comprises:

introducing a compressive instantaneous non-linearity into said windowed successive blocks prior to processing using said two-dimensional filter.

91. The compression system of claim 88, wherein said generating a neural encoding model further comprises:

segregating said filtered two-dimensional image raster into plural tiles, collectively defining said filtered, two-dimensional image raster, using a grid array filter.

* * * * *

UNITED STATES PATENT AND TRADEMARK OFFICE
CERTIFICATE OF CORRECTION

PATENT NO.    : 6,091,773
DATED         : July 18, 2000
INVENTOR(S)   : Mark R. Sydorenko It is certified that error appears in the above-identified patent and that said Letters Patent is hereby corrected as shown below:

Column 9,
Line 54, "coeffiecient" should read -- coefficient --;

Column 12,
Line 7, "Paugman" should read -- Daugman --;

Column 13,
Line 9, "Psuchophysics" should read -- Psychophysics --;
Line 17, "Disital" should read -- Digital --;
Line 21, "Neuroplisiol" should read -- Neurophysiol --;
Line 23, "Computer Simulations." should read -- Estimation of the Recovery of Discharge Probability in Cat Auditory Nerve Spike Trains and Computer Simulations. --; and
Line 25, "Digtal" should read -- Digital --.

Signed and Sealed this

Twenty-fifth Day of December, 2001

Attest:

*Attesting Officer*

JAMES E. ROGAN
*Director of the United States Patent and Trademark Office*